(12) United States Patent
Rametsteiner (10) Patent No.: US 10,624,337 B2
(45) Date of Patent: Apr. 21, 2020

(54) SUSTAINED RELEASE PARTICLES FOR CONTROLLING PLANT DAMAGING ORGANISMS

(71) Applicant: LITHOS CROP PROTECT GMBH, Ennsdorf (AT)

(72) Inventor: Karl Rametsteiner, Linz (AT)

(73) Assignee: LITHOS CROP PROTECT GMBH, Ennsdorf (AT)

( * ) Notice: Subject to any disclaimer, the term of this patent is extended or adjusted under 35 U.S.C. 154(b) by 0 days.

(21) Appl. No.: 15/525,531

(22) PCT Filed: Nov. 11, 2015

(86) PCT No.: PCT/EP2015/076354
§ 371 (c)(1),
(2) Date: Jun. 7, 2017

(87) PCT Pub. No.: WO2016/075205
PCT Pub. Date: May 19, 2016

(65) Prior Publication Data
US 2017/0332629 A1    Nov. 23, 2017

(30) Foreign Application Priority Data
Nov. 11, 2014   (EP) .................................. 14192683

(51) Int. Cl.
*A01N 25/10*   (2006.01)
*A01N 25/08*   (2006.01)
(Continued)

(52) U.S. Cl.
CPC ............... *A01N 25/26* (2013.01); *A01M 1/02* (2013.01); *A01N 25/10* (2013.01); *A01N 25/18* (2013.01);
(Continued)

(58) Field of Classification Search
None
See application file for complete search history.

(56) References Cited

U.S. PATENT DOCUMENTS 4,170,631 A    10/1979   Furniss
5,650,160 A    7/1997    Mazomenos
(Continued)

FOREIGN PATENT DOCUMENTS

EP    0131783 A1    1/1985
EP    0804877 A1    11/1997
(Continued)

OTHER PUBLICATIONS

International Search Report from international Appl. No. PCT/EP2015/076354, dated Feb. 15, 2016.

*Primary Examiner* — Kevin S Orwig
(74) *Attorney, Agent, or Firm* — Nevrivy Patent Law Group P.L.L.C.

(57) ABSTRACT

This invention relates to particles (1) with a controllable release of at least one pheromone, wherein a) the particle (1) has a core (2) which is surrounded by one or more layers (4, 6), and b) the core (2) and at least one layer (4, 6) surrounding the core (2) comprises at least one pheromone to be released, wherein the core (2) and/or at least one layer (4, 6) surrounding the core (2) comprises a substrate for binding or for absorbing the at least one pheromone to be released, wherein the substrate is capable of dispensing the absorbed pheromone in a delayed manner, and the substrate comprises zeolite.

16 Claims, 4 Drawing Sheets

(51) Int. Cl.
- *A01N 25/18* (2006.01)
- *A01N 25/26* (2006.01)
- *A01N 37/02* (2006.01)
- *A01M 1/02* (2006.01)
- *A01N 59/06* (2006.01)
- *B32B 7/10* (2006.01)
- *B32B 9/04* (2006.01)

(52) U.S. Cl.
CPC ............. *A01N 37/02* (2013.01); *A01N 59/06* (2013.01); *B32B 7/10* (2013.01); *B32B 9/045* (2013.01); *A01N 2300/00* (2013.01)

(56) References Cited

U.S. PATENT DOCUMENTS

| | | |
|---|---|---|
| 6,132,749 A | 10/2000 | Saguchi |
| 2006/0073180 A1 | 4/2006 | Steward |
| 2007/0163317 A1 * | 7/2007 | Birthisel ................ A01N 25/12 71/64.07 |
| 2007/0258907 A1 * | 11/2007 | Davis ................... A61K 49/189 424/9.322 |
| 2008/0214396 A1 * | 9/2008 | Best ...................... A01N 25/26 504/101 |
| 2013/0096207 A1 | 4/2013 | Yamashita |

FOREIGN PATENT DOCUMENTS

| | | | | |
|---|---|---|---|---|
| EP | 1064843 A1 | 1/2001 | | |
| EP | 1676480 A1 | 7/2006 | | |
| EP | 2781156 A1 | 9/2014 | | |
| WO | 1997033472 A1 | 9/1997 | | |
| WO | 200205641 A1 | 1/2002 | | |
| WO | WO 2003/061383 | * | 7/2003 | ............. A01N 25/08 |
| WO | WO-03061383 A1 * | 7/2003 | ............. A01N 25/08 | |

* cited by examiner

SUSTAINED RELEASE PARTICLES FOR CONTROLLING PLANT DAMAGING ORGANISMS

The present invention relates to particles with a controllable release of a plant protection ingredient, particularly a pheromone.

Plant protection products have to meet a great variety of requirements. On the one hand, the active ingredients contained in plant protection products must be capable of fighting plant pests as efficiently as possible, on the other hand these active ingredients should have the mildest possible or no side effects at all. Another requirement plant protection products must meet is their effective period. The effective period of a plant protection product applied has an immediate impact on the work effort involved and thus on the costs of plant protection. It is therefore desirable to use plant protection products that have an extended release period of the active plant protection ingredient contained therein.

Plant protection products are mainly spread on farming areas using the spraying method. This applies both to preparations that are applied to the plants to be cultivated themselves and to products that are to develop their effect in or above the soil. Alternatively, plant protection products can be applied using the watering method, but this requires large amounts of liquid and active ingredient. Such spreading methods also have the disadvantage that the active ingredients enter deeper soil layers, such that the plant to be protected can only inadequately be supplied with the active ingredient and the groundwater is contaminated. Furthermore, when using these methods, the active ingredient is washed out relatively fast from the soil areas treated, resulting in just a short-term effect of the plant protection product.

The pheromone disorientation method is frequently used in pest control to fight crop pests or keep them away from the plants.

Pheromones are very specific sexual attractants that typically act on one sex, in rare cases also on both sexes, and serve as semiochemicals, that is, messenger substances, to control the behavior of the insects. For example, pheromones emitted by females can attract males. Empirically selected or synthesized pheromones can thus be used to lure males into insect traps. It is more expedient, however, (success rate up to 80%) to spread suitable pheromones over large areas to prevent males from finding since the overwhelming majority of the pheromone sources there is not associated with a female. This confusion method that is based on disorientating the male insects can limit reproduction of a pest in a predetermined area in an environmentally friendly manner to an extent that no longer harms the crop yield. The only requirement is that the pheromones that are specifically adapted to a pest are distributed in an amount sufficient to confuse the pest over the cultivation area to be protected. In addition, it must be ensured that these pheromones are released within a period of time in which the pests to be controlled are sexually active.

Pheromones are active at extremely low concentrations ($ng/m^3$ air) and have a limited period of efficacy, since they are necessarily volatile chemicals. In practice, this period is based on the time span between application in the area needed (soil, forest, field, glass house, . . . ) and the resulting dilution/volatilization to a concentration that is no longer effective.

As mentioned, readiness to mate typically lasts for a very limited time and does not necessarily correlate with the spreading of the plant protection product, which is time-limited as well. It may for example become necessary to add the pheromones to the soil together with the seeds, although the mating period of the insects will only start weeks/months later and may be associated with the bloom phase of the plants. To circumvent this disadvantage, it is beneficial if the plant protection product is capable of releasing the respective active plant protection ingredient, particularly pheromones, into the environment over a specific period of time.

EP 1 064 843, for example, describes a process in which specific pheromones are adsorbed in synthetic zeolites, such that pheromones are released into the environment over a longer period of time. The zeolites can be applied as powder, granulates, and conglomerates.

EP 1 676 480 proposes to generally embed pheromones in crystalline materials at a concentration of 1-30 percent by mass, silicates such as montmorillonites, palygorskites, and sepiolites being considered particularly suitable.

AT 508 914 describes the production of a preparation impregnated with pheromones, wherein the water content of a zeolite is reduced before the pheromone is introduced.

Instead of minerals (typically silicates), cyclodextrins have been proposed for binding pheromones in the literature.

U.S. Pat. No. 5,650,160 proposes to include specific pheromones in cyclodextrin, particularly cyclodextrins with methylation of the hydroxyl group.

US 2013/0096207 proposes a combination of pheromone embedded in cyclodextrin and free cyclodextrin in a water-soluble polymer. Due to the high cost of cyclodextrins, the use of cyclodextrin not mixed with pheromones is particularly economically disadvantageous.

WO 97/33472 discloses compositions with a pesticidal or herbicidal effect. These compositions include particles consisting of a core impregnated with a pesticide or herbicide and encased in an electrically resistive coating. An additional pesticide or herbicide can be provided on the outer side of the coating. Substrate materials for the core include silicon dioxide, magnesium silicate (talc), silica, cellulose, or natural or synthetic polymers such as chitin, chitosan, or rubber. The electrically resistive material can be a wax, lipid, a natural or synthetic resin, or a natural or synthetic polymer.

EP 0 804 877 relates to solid materials with antimicrobial properties, which can include both antimicrobial metal ions and antimicrobial metals. These materials can have the form of particles. The antimicrobial metal ions of these particles can be continuously released into the environment over a longer period of time.

US 2006/073180 describes methods and means of controlling fire ants. Fire ant baits are used that include particles consisting of a substrate material impregnated with an insecticide. The substrate material impregnated with the insecticide can be coated with a material for the delayed release of active agents. This material can be a wax, a starch, a polymer, or combinations thereof.

WO 02/05641 relates to formulations that include solid coated pesticide particles with slow and fast release of the active agent. The pesticides contain an active agent that is formulated into particles with an inert substrate and a tenside. According to WO 02/05641, these particles are coated with a thermoplastic polymer that can be emulsified with water.

EP 2 781 156 discloses a means acting against insects, which includes an egg imitation coated with suitable pheromones, giving the insects the impression that these are genuine insect eggs. In addition, this means includes particles that are coated or impregnated with an insect repellent.

U.S. Pat. No. 6,132,749 describes particles of synthetic resin impregnated with pheromones, which particles are capable of releasing pheromones in a delayed manner into the environment.

EP 0 131 783 relates to particles that are capable of releasing substances like pheromones into the environment. The particles consist of a powdery substrate and a binding agent that combines the ingredients of the substrate into a particle. The inert substrate can for example be a silicate or polysaccharide. The binding agent is preferably a polysaccharide or a synthetic polymer such as the polyamide or polyester.

U.S. Pat. No. 4,170,631 describes compositions which are suitable to control certain types of beetles. These can compositions are capable to release pheromones in a time-delayed manner.

It is an object of this invention to provide means comprising active plant protection ingredients, particularly pheromones, which facilitate a more constant release of the active ingredient over a longer period of time than those means known from prior art. In addition, the means according to the invention is to bind active plant protection ingredients in a form optimized for agriculture to ensure storage stability of the plant per detection product, such that a potential drop in efficacy is prevented or reduced.

Pheromones are by their nature volatile compounds that dock on to specific receptors in insects and can cause the desired reactions (e.g. readiness for mating) in them. Accordingly, pheromones comprise the reactive groups which allow such bonds, among other things, or can trigger respective reactions. Reactive groups that are frequently present in pheromones or double bonds, aldehyde, ketone, or ester groups, stereospecific alignment, cis/trans isomerism. On the other hand, the presence of reactive groups means increased reactivity towards environmental influences such as temperature, UV radiation, hydrolysis, oxidation, isomerization, etc. It is therefore another problem of the invention to protect pheromones from such influences long enough that they can unfold the biological aspect within days/weeks/months after continuous release.

This invention relates to particles with a controllable release of at least one pheromone, wherein a) the particle has a core which is surrounded by one or more layers, and b) the core and at least one layer surrounding the core comprises at least one pheromone to be released, wherein the core and/or at least one layer surrounding the core comprises a substrate for binding or for absorbing the at least one pheromone to be released, wherein the substrate is capable of dispensing the absorbed pheromone in a delayed manner, and the substrate comprises zeolite.

This invention also relates to particles comprising at least one pheromone, wherein a) the particle has a core which is surrounded by one or more layers, and b) the core and at least one layer surrounding the core comprises at least one pheromone to be released, wherein the core and/or at least one layer surrounding the core comprises zeolite.

According to the invention, the release of active plant ingredients from particles is better controllable over a specific period of time if the core of the particle comprises, on the one hand, zeolite and, on the other hand, is surrounded by at least one layer, and that both the core and its surrounding layer comprises an active plant protection ingredient, particularly a pheromone. In this way, it is possible that one or more pheromones is/are released into the environment over a longer period of time. The order in which each active ingredient is released can also be controlled. According to the invention, other substrates than zeolite can be used in which the at least one pheromone can be absorbed, embedded, etc. to then be released again over a specific period of time. The at least one layer surrounding the core can for example slow down diffusion of the at least one active ingredient and therefore slow down its release. If the core and/or the layer surrounding the core includes, for example, a biodegradable substrate, the speed and time sequence of the release of the at least one active plant protection ingredient does not only depend on slow physical diffusion of the active ingredient from the substrate. The time sequence of the release of the at least one active ingredient will in such a case also be influenced by the biocatalytic degradation of the substrate (e.g. hydrolysis of cyclodextrins).

The core and/or at least one layer surrounding the core of the particles according to the invention comprise(s) zeolite for binding or for absorbing the at least one active ingredient to be released, which is capable of releasing the absorbed active ingredient in the time delayed manner. It was found in experiments that, unlike other substrates of active ingredients, zeolites can constantly release pheromones over a longer period of time (see the examples below). Zeolites do not only have the advantage that the are capable of continuously releasing pheromones over a relatively long period of time, but also that they protect the reactive groups of the pheromones from outside influences (e.g. weather conditions).

"Particles," as used herein, refers to solid particles that can have any desired shape and are preferably up to 1 cm in size. The particles according to the invention comprise a core which includes a defined substrate, wherein the core is at least partially surrounded by at least one layer.

"Substrate," as used herein, refers to a material or composition of materials that forms the core and/or the at least one layer surrounding the core, or parts thereof.

"Active plant protection ingredient," as used herein, can be any substance that is capable of or has the effect of preventing any type of infestation of the plant by pests of any kind, or of fending off, deterring, destroying the pest, or of reducing the damage it causes in another way.

Plant pests can belong to various groups of living beings. Among higher order animals, these are particularly specific types of insects and mites, also nematodes and snails. Vertebrates such as mammals and birds can also cause considerable damage to plants or crops. Other plant pests are microbes, such as fungi and bacteria, mycoplasms, and viruses. Accordingly, the concept of an "active plant protection ingredient" includes pesticides, particularly avicides, acaricides, bactericides, anti-feedants, fungicides, insect attractants (pheromones), insecticides, insect repellents, molluscicides, nematicides, mating disrupters, and rodenticides. According to the invention, preferred active plant protection ingredients are selected from the group of fungicides and insecticides (see, for example, "Wirkstoffe in Pflanzenschutz-und Schädlingsbekämpfungsmitteln" [Active agents in plant protection products and pesticides] by Chemie-Wirtschaftsförderungs-Gesellschaft, published 2002 by BLV Verlag).

"Time-delayed," as used herein, means that the active plant protection agent is released into the environment as uniformly as possible over a specific period of time (minutes, hours, days, weeks). In the meaning of the invention "time-delayed" means that at most 50% of the at least one active plant protection ingredient are released in 24, preferably in 48, more preferably in 72, more preferably in 96, more preferably in 120, more preferably in 144, more preferably in 168, more preferably in 336, more preferably in 504, more preferably in 1000, more preferably in 2000 hours, preferably that at most 75% are released in 24, preferably in 48, more preferably in 72, more preferably in 96, more preferably in 120, more preferably in 144, more preferably in 168, more preferably in 336, more preferably in 504, more preferably in 1000, more preferably in 2000 hours, particularly preferably that at most 80% are released in 24, preferably in 48, more preferably in 72, more preferably in 96, more preferably in 120, more preferably in 144, more preferably in 168, more preferably in 336, more preferably in 504, more preferably in 1000, more preferably in 2000 hours from the particle or from the core or from the at least one layer surrounding the core. Alternatively, the active plant protection ingredient according to the invention is released in 24, preferably in 48, more preferably and 72, more preferably in 96, more preferably in 120, more preferably in 144, more preferably in 168, more preferably in 336, more preferably in 504, more preferably in 1000, more preferably in 2000 hours, preferably between 30 and 95%, preferably between 30 and 90%, more preferably between 30 and 80%, more preferably between 40 and 80%, from the particle or from the core or from the at least one layer surrounding the core.

In many cases, it is required to apply the plant protection products in the field before the crops germinate, immediately after or before the crops have reached a specific height. The period between applying the particles according to the invention and the mating period of the insects can stretch over a period of 15 days to 6 months, particularly of 1 to 3 months (varies depending on type of insect). This period must be bridged in such a manner that the active plant protection ingredients, particularly pheromones, are released as evenly as possible over this period of time to achieve an effective concentration throughout the entire period. In this period, the active plant protection ingredient has to be released as evenly as possible in a time-delayed manner, such that as constant a quantity of active plant protection ingredient as possible is released over this period of time.

According to a preferred embodiment of this invention, the at least one pheromone is released over a period of 6 months, preferably of 5 months, more preferably of 4 months, more preferably of 3 months, more preferably of 60 days, more preferably of 50 days, more preferably of 40 days, more preferably of 30 days, more preferably of 20 days, more preferably of 15 days. According to the invention, it is particularly preferred that the pheromone is continuously dispensed, that is, released into the environment, over a period of 1 to 200 days, preferably of 5 to 150 days, more preferably of 10 to 90 days.

According to a particularly preferred embodiment of this invention, the substrate or the core and/or at least one layer surrounding the core includes at least 20%, preferably at least 30%, more preferably at least 40%, more preferably at least 50%, more preferably at least 60%, more preferably at least 70%, more preferably at least 80%, more preferably at least 85%, more preferably at least 90%, more preferably at least 95%, more preferably at least 97%, more preferably at least 98%, more preferably at least 99%, particularly 100%, of zeolite before the at least one pheromone is deposited or introduced. It is preferred that the substrate or the core and/or at least one layer surrounding the core is made of zeolite before the at least one variable is deposited or introduced.

The diameter or the size of the particles according to the invention preferably is between 0.1 μm and 10 mm, more preferred between 0.1 μm and 5 mm, more preferred between 0.1 μm and 3 mm, more preferred between 0.1 μm and 2 mm, more preferred between 0.1 μm and 1 mm, more preferred between 0.1 μm and 500 μm, more preferred between 0.1 μm and 200 μm, more preferably between 0.1 μm and 100 μm, more preferred between 0.1 μm and 50 μm, more preferred between 0.1 μm and 25 μm, more preferred between 0.5 μm and 5 mm, more preferred between 0.5 μm and 3 mm, more preferred between 0.5 μm and 2 mm, more preferred between 0.5 μm and 1 mm, more preferred between 0.5 μm and 500 μm, more preferred between 0.5 μm and 200 μm, more preferred between 0.5 μm and 100 μm, more preferred between 0.5 μm and 50 μm, more preferred between 0.5 μm and 25 μm, more preferred between 1 μm and 5 mm, more preferred between 1 μm and 3 mm, more preferred between 1 μm and 2 mm, more preferred between 1 μm and 1 mm, more preferred between 1 μm and 500 μm, more preferred between 1 μm and 200 μm, more preferred between 1 μm and 100 μm, more preferred between 1 μm and 50 μm, more preferred between 1 μm and 25 μm, more preferred between 10 μm and 5 mm, more preferred between 10 μm and 3 mm, more preferred between 10 μm and 2 mm, more preferred between 10 μm and 1 mm, more preferred between 10 μm and 500 μm, more preferred between 10 μm and 200 μm, more preferred between 10 μm and 100 μm, more preferred between 10 μm and 50 μm, more preferred between 10 μm and 25 μm, more preferred between 50 μm and 5 mm, more preferred between 50 μm and 3 mm, more preferred between 50 μm and 2 mm, more preferred between 50 μm and 1 mm, more preferred between 50 μm and 500 μm, more preferred between 50 μm and 200 μm, more preferred between 50 μm and 100 μm, more preferred between 100 μm and 5 mm, more preferred between 100 μm and 3 mm, more preferred between 100 μm and 2 mm, more preferred between 100 μm and 1 mm, more preferred between 100 μm and 500 μm, more preferred between 100 μm and 200 μm. It is particularly preferred that the particles according to the invention have a diameter or size of 0.1 μm to 3 mm, preferred 0.1 μm to 25 μm or 500 μm to 3 mm. The diameter or the size of the particles according to the invention preferably is between 0.05 μm and 8 mm, more preferred between 0.05 μm and 5 mm, more preferred between 0.05 μm and 1 mm, more preferred between 0.05 and 500 μm, more preferred between 0.1 μm and 5 mm, more preferred between 0.1 μm and 1 mm, 0.1 and 500 μm, more preferred between 0.1 and 400 μm, more preferred between 0.1 and 300 μm, more preferred between 0.1 and 200 μm, more preferred between 0.1 and 100 μm, more preferred between 0.1 and 50 μm, more preferred between 0.1 and 20 μm, more preferred between 0.1 and 10 μm, more preferred between 0.1 and 5 μm, more preferred between 0.5 and 400 μm, more preferred between 0.5 and 300 μm, more preferred between 0.5 and 200 μm, more preferred between 0.5 and 100 μm, more preferred between 0.5 and 50 μm, more preferred between 0.5 and 20 μm, more preferred between 0.5 and 10 μm, more preferred between 0.5 and 5 μm, more preferred between 1 and 400 μm, more preferred between 1 and 300 μm, more preferred between 1 and 200 μm, more preferred between 1 and 100 μm, more preferred between 1 and 50 μm, more preferred between 1 and 20 μm, more preferred between 1 and 10 μm, more preferred between 1 and 5 μm, more preferred between 100 μm and 8 mm, more preferred between 100 μm and 5 mm, more preferred between 100 μm and 1 mm, more preferred between 100 and 500 μm, more preferred between 400 μm and 8 mm, more preferred between 400 μm and 5 mm, more preferred between 400 μm and 1 mm, more preferred between 400 and 500 µm, more preferred between 500 µm and 8 mm, more preferred between 500 µm and 5 mm, more preferred between 500 µm and 1 mm, more preferred between 1 mm and 8 mm, more preferred between 1 mm and 5 mm, more preferred between 1 mm and 2 mm. It is preferred that the thickness of the at least one layer surrounding the core is between 0.1 and 500 µm, more preferred between 0.1 and 400 µm, more preferred between 0.1 and 300 µm, more preferred between 0.1 and 200 µm, more preferred between 0.1 and 100 µm, more preferred between 0.1 and 50 µm, more preferred between 0.5 and 20 µm, more preferred between 0.5 and 10 µm, more preferred between 0.5 and 5 µm, more preferred between 0.5 and 400 µm, more preferred between 0.5 and 300 µm, more preferred between 0.5 and 200 µm, more preferred between 0.5 and 100 µm, more preferred between 0.5 and 50 µm, more preferred between 0.5 and 20 µm, more preferred between 0.5 and 10 µm, more preferred between 0.5 and 5 µm, more preferred between 1 and 400 µm, more preferred between 1 and 300 µm, more preferred between 1 and 200 µm, more preferred between 1 and 100 µm, more preferred between 1 and 50 µm, more preferred between 1 and 20 µm, more preferred between 1 and 10 µm, more preferred between 1 and 5 µm. The thickness of the layer can be determined using methods known to a person skilled in the art, for example by scanning electron microscopy. The diameter or size of the particles according to the invention or of the cores of these particles can be determined using methods known to a person skilled in the art, for example by light microscopy. The particles according to the invention preferably have a particle size distribution of 0.1 µm and 10 mm, more preferred as defined above. The particle size distribution is such that at least 50%, preferably at least 70%, more preferred at least 80%, more preferred at least 90%, more preferred at least 95%, particularly 100% of the particles have a diameter or size of 0.1 µm and 10 mm, more preferred as defined above.

The core of the particle according to the invention is surrounded by one or more or by at least one layer. It is preferred that the core is surrounded by at least two, more preferred by at least three, more preferred by at least four, one preferred by at least five, more preferred by at least six, more preferred by at least seven, or preferred by at least eight layers. The particles according to the invention preferably comprise a maximum of ten, preferably a maximum of nine layers that surround the core of the particle. Particularly preferred are particles whose core is surrounded by two to eight, preferably by two to six, more preferably by three to five, particularly by four layers.

The particles according to the invention include at least one pheromone as an active plant protection ingredient. The particles according to the invention can of course include other active plant protection ingredients in addition to pheromones, such as defined above, for example.

The term "pheromone," as used herein, refers to signaling substances that are effective at extremely low concentrations and used for chemical communication among organisms of one species. Pheromones are found in the communication systems of almost all living beings from unicellular organisms to mammals and play a prominent role as sexual attractants. Primarily, pheromones are frequently used for controlling insects to disrupt the mating process of the insects and significantly reduce the reproduction of the insects.

Pheromones are particularly well suited for fighting plant pests because they typically are non-toxic natural substances or near-natural synthetic compounds. Pheromones are applied at very low quantities to agricultural areas where they evaporate and—unlike other frequently used active plant protection agents—leave no residues. The preferred additional use of degradable pheromone carriers (e.g. zeolites, polysaccharides) ensures that the particles according to the invention do not have an environmental impact, as for example neonicotinoids.

The pheromones used according to the invention can be produced or obtained using conventional methods, either synthetically or by extraction from pheromone-containing parent materials.

Pheromones can comprise the most varied groups of substances, wherein the large number of the pheromones can be derived from saturated and unsaturated hydrocarbons. Pheromones can therefore include alkanes, alkenes, ethers, esters, aldehydes, or ketones with chain lengths from 5 to 30, preferred from 10 to 20, carbon residues and most of them are therefore sparingly soluble in water.

The particles according to the invention can be used to control organisms harmful to plants, such as field pests or insect pests in fruit orchards. The group of field pests includes organisms (e.g. insects) which can harm, for example, crops such as corn, rice, cereals, cotton, and potatoes. Insects that can be controlled using the particles according to the invention or the composition according to the invention and that are corn pests include the European corn borer (*Ostrinia nubilalis*), the Northern corn rootworm (*Diabrotica barberi*), the Southern corn rootworm (*Diabrotica undecimpunctata howardi*), and the spotted corn rootworm (*Diabrotica undecimpunctata undecimpunctata*). Insects and nematodes that can be controlled using the particles according to the invention or the composition according to the invention and that are rice pests, include the striped rice stem borer (*Chilo suppressalis*), the rice ear bug (*Leptocorisa acuta*), the green paddy leafhopper (*Nephotettix virescens*), the rice stem nematode (*Ditylenchus angustus*), and the rice weevil (*Sitophilus oryzae*). Insects that can be controlled using the particles according to the invention or the composition according to the invention and that are cereal pests include the wheat weevil (*Sitophilus granarius*), the saddle gall midge (*Haplodiplosis equestris*), the cereal leaf beetle (*Oulema melanopus*), the small cereal leaf beetle (*Oulema gallaeciana*), the wheat blossom midge (*Contarinia tritici* and *Sitodiplosis mosellana*), the English grain aphid (*Sitobion avenae*), the rose-grass aphid (*Metopolophium dirhodum*), the bird cherry-oat aphid (*Rhopalosiphum padi*), and the thrips (*Thysanoptera*). Insects that can be controlled using the particles according to the invention or the composition according to the invention and that are cotton pests include the pink bollworm (*Pectinophora gossypiella*) and the American cotton bollworm (*Helicoverpa zea*). Insects and nematodes that can be controlled using the particles according to the invention or the composition according to the invention and that are potato pests include the potato aphids (*Myzus persicae* and *Aphis* spp.), the yellow potato cyst nematode (*Globodera rostochiensis*), and the potato beetle (*Leptinotarsa decemlineata*). The group of fruit pests includes organisms (e.g. insects) that can harm fruit plants, such as apple, plum, peach, and cherry trees as well as vines. Insects that can be controlled using the particles according to the invention or the composition according to the invention and that are fruit pests include the codling moth (*Cydia pomonella*), the winter moth (*Operophtera brumata*), the apple ermine moth (*Yponomeuta malinellus*), the orchard ermine moth (*Yponomeuta padella*), the San Jose scale (*Diaspidiotus perniciosus*), the apple clearwing moth (*Synanthedon myopaeformis*), the peach moth (*Grapholita molesta*), the cherry fruit moth (*Ar-* gyresthia pruniella), the vine moth (*Eupoecilia ambiguella*), the European grapevine moth (*Lobesia botrana*), the brown and black beetle (*Bromius obscurus*), the vine leaf roller (*Sparganothis pilleriana*), the black vine weevil (*Otiorhynchus sulcatus*), the grapevine aphid (*Aphis illinoisensis*), and the citrus flatid planthopper (*Metcalfa pruinosa*).

According to a preferred embodiment of the present invention, the pheromone that can be used, for example, to control the corn rootworm, is selected from the group consisting of 8-methyl-2-decanol propanoate, 10-methyl-2-tridecanone, 6,12-dimethyl pentadeca-2one, capric acid methyl ester, 4-methoxy cinnamic aldehyde, 2-phenyl ethanol, syn-benzaldoxime, linalool, β-caryophyllene, 9-dodecenyl acetate, periplanone B, and retronecine ester.

Other suitable pheromones are disclosed, for example, in "Behavior-Modifying Chemicals for Insect Management: Applications of Pheromones and Other Attractants" (1990, CRC Press, R L Ridgway, R M Silverstein and M N Inscoe) or are sufficiently known to a person skilled in the art (see, for example, http://www.pherobase.com/).

According to the invention, the core and at least one layer surrounding the core include at least one pheromone to be released. According to a particularly preferred embodiment of the present invention, the core includes a different pheromone from the at least one layer surrounding the core. This means that it is preferred that the core of the at least one layer as defined above include different pheromones.

If the core of the particle according to the invention is at least partially, preferably fully, surrounded or coated by more than one layer, these can include the same or different pheromones. Providing different pheromones in the particle according to the invention has the advantage that, due to the delayed release of individual active ingredients, the time when a specific active ingredient contained in the popular according to the invention is released can be controlled. Initially, those active ingredients are released into the environment that are located in external regions or layers of the particles. The longer the particles according to the invention are exposed to the environment, the more they will release those pheromones that are located in the core or in layers closer to the core. The active plant protection ingredients, particularly pheromones, which are contained in the particle according to the invention, can for example be released by evaporation or desorption. The active plant protection ingredients can also be released from the particles by the biological or chemical degradation (e.g. by hydrolysis or oxidation, for example of organic portions) of the particles or parts thereof (core, layers).

Providing different active plant protection ingredients such as pheromones in different sections of the particle according to the invention has the advantage, that individual active ingredients can be released at different points in time for a more effective protection of the plants. This primarily allows taking into account the different life cycles of insects for pest control.

The core and the at least one layer surrounding the core can of course include the same active plant protection ingredient or the same pheromone. This action ensures that one and the same active ingredient is released into the environment over a long period of time.

According to a preferred embodiment of the present invention, the core and at least one layer surrounding the core include a substrate for binding or for absorbing the at least one pheromone to be released, wherein the substrate is capable of releasing the active ingredient absorbed in a time-delayed manner.

To control or delay the timing of the release of one or several active plant protection ingredients from the particle over a long period of time, the core as well as the at least one layer surrounding the core include a substrate that is capable of absorbing the active ingredient(s) and of releasing it/them over time. The particles are designed such that the substrate or the substrates release(s) the active plant protection ingredients over as defined the period of time as possible, e.g. a period of 15 days to 6 months, particularly of 1 to 3 months.

According to a preferred embodiment of the present invention, the core and/or at least one layer surrounding the core include, in addition to zeolite, another compound comprising a porous substrate and/or a macromolecular cavity.

Porous materials are particularly preferred because they have a relatively large surface on which an accordingly large quantity of pheromones can be adsorbed. The porous substrate preferably comprises a porosity (ratio of cavity volume to total volume) of 10 to 90%, preferred of 20 to 70%, more preferred of 30 to 60%.

"Compounds comprising a macromolecular cavity," as used herein, are compounds, preferably organic compounds, that are capable of forming cavities. The cavity formed is preferably hydrophobic and the outer shell is hydrophilic. Examples of such components are for example cyclodextrins.

The preferred pore size of the porous substrate is at least 20 nm, preferably at least 40 nm, more preferably at least 50 nm.

Pore size and porosity can be determined using mercury intrusion porosimetry.

According to another preferred embodiment of the present invention, the core and/or at least one layer surrounding the core includes, in addition to zeolite, another inorganic porous substrate selected from the group consisting of microporous minerals, phyllosilicates, preferably clay mineral, and combinations thereof.

According to a preferred embodiment of the present invention, the core and/or at least one layer surrounding the core includes a compound comprising a macromolecular cavity selected from the group consisting of metal-organic frameworks (MOF), macrocyclic compounds, preferably oligosaccharides or cyclic polysaccharides, calixarenes, and combinations thereof.

Calixarenes that can be used according to the invention are described in U.S. Pat. No. 4,699,966 and WO 89/08092. Cyclodextrins and/or their derivatives can be used as cyclic oligosaccharides. Particularly suitable cyclodextrins are alpha-cyclodextrin, beta-cyclodextrin or gamma-cyclodextrin as well as their methyl, triacetyl, hydroxypropyl, or hydroxyethyl derivatives. Starches and/or their degradation products are used as non-cyclic oligosaccharides, for example. The substrate(s) of the particles according to the invention preferably include(s) at least one (more preferred at least two, three, or four) of the substances listed above.

Microporous materials used according to the invention, such as zeolites, and phyllosilicates, preferably clay materials, are inorganic minerals comprising pores of a specific size. Organic molecules such as metal-organic frameworks (MOF), macrocyclic compounds, preferably cyclic oligosaccharides, cyclic polysaccharides, and calixarenes comprise cavities in which molecules such as the active plant protection ingredients according to the invention, can intercalate. The result is some type of organic clathrate. Particularly preferred are particles whose core includes natural and/or synthetic zeolite. The grain size of the zeolite used can vary, wherein a grain size of 0.1 to 10 μm, preferably 2 to 5 μm, is particularly preferred. Zeolites occur in nature or can be produced synthetically. Zeolites are composed of $M^{n+}_{x/n}[(AlO_2)^-_x(SiO_2)_y].zH_2O$, wherein n is the charge of the cation M of an alkali or alkaline earth metal and mostly is 1 or 2, z indicates the number of water molecules the crystal has taken up. The molar ratio of $SiO_2$ to $AlO_2$ or y/x in the molecular formula, respectively, cannot be smaller than 1.

Preferred synthetic zeolites are zeolites selected from the group consisting of zeolite A $(Na_{12}[(AlO_2)_{12}(SiO_2)_{12}].27H_2O)$, zeolite X $(Na_{86}[(AlO_2)_{86}(SiO_2)_{106}].264H_2O)$, zeolite Y $(Na_{56}[(AlO_2)_{56}(SiO_2)_{136}].250H_2O)$, zeolite L $(K_9[(AlO_2)_9(SiO_2)_{27}].22H_2O)$, mordenite $(Na_{8.7}[(AlO_2)_{8.7}(SiO_2)_{39}].24H_2O)$, ZSM 5 $(Na_{0.3}H_{3.8}[(AlO_2)_{4.1}(SiO_2)_{91.9}])$, ZSM 11 $(Na_{0.1}H_{1.7}[(AlO_2)_{1.8}(SiO_2)_{94.2}])$ and combinations thereof, wherein zeolite is particularly preferred.

Natural zeolites do not have a general uniform structure but are as a rule hybrid types. Since such zeolites are particularly well suited to release active plant protection ingredients with a time delay, natural zeolites are particularly preferred.

Alternatively, or in addition, the particles according to the invention can include phyllosilicates. Phyllosilicates (sheet silicates, layered silicates) are silicates whose silicate anions consist of layers of corner-connected $SiO_4$ tetrahedrons. These layers or double layers are not linked into lattices via other Si—O bonds. The Strunz classification system considers the silicate rings of which the layers are composed and classifies the division of phyllosilicates (9.E) by the number of these rings, the multiplicity of layers and the connection of layers by octahedrally coordinated cations. According to a preferred embodiment of the present invention, the phyllosilicate is selected from the group consisting of simple tetrahedral layers having 4, 5, (6), and 8-fold rings, particularly a phyllosilicate from the apophyllite group, the okenite group, or the ajoite group, phyllosilicates with mica sheets (three-layer silicates) composed of tetrahedral and octahedral layers, particularly a phyllosilicate from the talc group, the pyrophyllite group, the muscovite group, the phlogopite group, the illite group, the montmorillonite group, the saponite group, the vermiculite group, or the chlorite group, phyllosilicates with kaolinite layers (two-layer silicates) composed of tetrahedral and octahedral layers, particularly a phyllosilicate from the kaolinite group, the halloysite group, the serpentine group, or the bismuth ferrite group, simple tetrahedron nets of six-fold rings connected via octahedral nets or ribbons, particularly a phyllosilicate from the palygorskite group, the sepiolite group, the gyrolite group, the makatite group, or the zeophyllite group. A phyllosilicate selected from the group consisting of the talc group, the muscovite group, the montmorillonite group, and the vermiculite group is particularly preferred.

According to another preferred embodiment of the present invention, the particles according to the invention, particularly the core and/or core-surrounding layer(s) include cyclodextrins. Cyclodextrins are cyclical oligosaccharides and represent ring-shaped degradation products of starch. They consist of α-1,4-glycosidically linked glucose molecules. Cyclodextrins are named differently depending on the number of glucose units that form their structure: α-cyclodextrin comprises 6 glucose molecules, β-cyclodextrin comprises 7 glucose molecules, γ-cyclodextrin comprises 8 glucose molecules, and δ-cyclodextrin comprises 9 glucose molecules. Since cyclodextrins are capable of enclosing non-polar organic compounds, this type of substances can protect enclosed substances from surrounding compounds (e.g. oxygen) and release the enclosed substances over a longer period of time.

Cyclodextrins can for example be produced biotechnologically by enzymatic degradation of starch. The enzymes used for this purpose are called cyclodextrin glucosyl transferases. In addition, there are selected enzymes that can produce α-, β-, and γ-cyclodextrin in a targeted manner. Cyclodextrins can also be modified.

The type and structure of the cyclodextrins used according to the invention is preferably selected with regard to the chemical structure of the active plant protection ingredients, particularly the pheromones. The cyclodextrin can be selected such that its cavity volume and/or its surface affinity (hydrophobic, hydrophilic) is adapted to the physical and chemical properties of the active plant protection ingredient.

The substrates of the particles according to the invention, particularly their core and/or core-surrounding layer(s), can also include MOFs (metal organic frameworks). MOFs are microporous crystalline synthetic materials with a three-dimensional network, wherein the structures consist of metallic nodes and organic connecting elements. Pores of different sizes can be designed in these structures depending on the metal and connecting element used. In this process, lattices with surfaces up to 4,500 $m^2/g$ are formed. MOFs can be synthesized from metal nitrates and tricarboxylic acids in a dialkyl format. For example, 4 moles of zinc nitrate hexahydrate can be mixed with 3 moles of terephthalic acid in diethyl formamide and incubated at about 100° C. for 24 hours. This yields so-called MOF-5 of the formula $Zn_4O(BDC)_3$ with diethyl formamide as guest molecule in the pores. When heating the product to over 120° C. in a vacuum, the guest molecule is released, and pores of about 6 nm remain. Analogously, a number of MOFs whose pore volume is adjustable can be synthesized from other metal nitrates (Al, Mg, Fe . . . ) and carboxylic acids. This means that a specific MOF can be selected based on the active plant protection ingredient selected. The pheromones are included, e.g. as guest in the MOF host, by mixing them in organic media such as esters or ketones.

Natural zeolites with a relatively high portion of klinoptinolith have proved particularly suitable, since their relatively inhomogeneous cage structure (compared to synthetic zeolites) provides a wide range of adsorption spaces with respect to size, distribution, and surface quality to the pheromones. And optimized protection and release profile can be generated in combination with other cage structures of MOF, cyclodextrins.

According to a particularly preferred embodiment of the present invention, the particle includes a core of an inorganic porous substrate and at least one layer surrounding the core with a compound comprising a macromolecular cavity.

It is particularly preferred that different substrates are used in each area of the particles according to the invention. For example, a combination of cyclodextrins and zeolite has more advantageous properties with respect to the release of enclosed or adsorbed active plant protection ingredients, particularly pheromones, than the use of a single substrate. This can be attributed to the fact that the substrates used have different properties with respect to the release of the bound active ingredients. It is preferred that the core of the particle includes, for example, a zeolite and at least one layer of cyclodextrin surrounding the core.

According to a preferred embodiment of the present invention, at least one intermediate layer is provided between the core and the at least one layer surrounding the core and including the active ingredient and/or between two layers surrounding the core and including the active ingredient.

An intermediate layer as mentioned above is used to separate or isolate the individual areas of the particle according to the invention. An intermediate layer therefore serves as a barrier against the underlying layer or the core below it. This barrier can significantly reduce or prevent diffusion between the individual layers and the core. The release of the active plant protection ingredients can be controlled by the chemical degradability of the intermediate layer. Another advantage of intermediate layers is that they can be used to separate the individual areas of the particles according to the invention in the production process, which allows the production of defined layer structures around the core.

The intermediate layer preferably comprises a polymer, preferably a modified or non-modified biopolymer, or a layered mineral.

It is preferred that the thickness of the intermediate layer is between 0.1 and 500 µm, more preferred between 0.1 and 400 µm, more preferred between 0.1 and 300 µm, more preferred between 0.1 and 200 µm, more preferred between 0.1 and 100 µm, more preferred between 0.1 and 50 µm, more preferred between 0.5 and 20 µm, more preferred between 0.5 and 10 µm, more preferred between 0.5 and 5 µm, more preferred between 0.5 and 400 µm, more preferred between 0.5 and 300 µm, more preferred between 0.5 and 200 µm, more preferred between 0.5 and 100 µm, more preferred between 0.5 and 50 µm, more preferred between 0.5 and 20 µm, more preferred between 0.5 and 10 µm, more preferred between 0.5 and 5 µm, more preferred between 1 and 400 µm, more preferred between 1 and 300 µm, more preferred between 1 and 200 µm, more preferred between 1 and 100 µm, more preferred between 1 and 50 µm, more preferred between 1 and 20 µm, more preferred between 1 and 10 µm, more preferred between 1 and 5 µm.

According to a particularly preferred embodiment of the present invention, the particles according to the invention have a hydrophobic surface coating. The hydrophobic surface coating makes the particles water-repellent. In this way, the active plant protection ingredients located in the particles are better protected against any washing out (e.g. during rainfall). Providing a hydrophobic coating has the general advantage that the release rate of active plant protection ingredients, particularly pheromones, from the particle according to the invention is reduced, such that these active ingredients are released into the environment over a longer period of time.

The hydrophobic surface coating preferably includes fatty acid esters, fatty acid amides, fatty acid salts, or polysiloxanes.

It is preferred that the thickness of the hydrophobic surface coating is between 0.1 and 500 µm, more preferred between 0.1 and 400 µm, more preferred between 0.1 and 300 µm, more preferred between 0.1 and 200 µm, more preferred between 0.1 and 100 µm, more preferred between 0.1 and 50 µm, more preferred between 0.5 and 20 µm, more preferred between 0.5 and 10 µm, more preferred between 0.5 and 5 µm, more preferred between 0.5 and 400 µm, more preferred between 0.5 and 300 µm, more preferred between 0.5 and 200 µm, more preferred between 0.5 and 100 µm, more preferred between 0.5 and 50 µm, more preferred between 0.5 and 20 µm, more preferred between 0.5 and 10 µm, more preferred between 0.5 and 5 µm, more preferred between 1 and 400 µm, more preferred between 1 and 300 µm, more preferred between 1 and 200 µm, more preferred between 1 and 100 µm, more preferred between 1 and 50 µm, more preferred between 1 and 20 µm, more preferred between 1 and 10 µm, more preferred between 1 and 5 µm.

According to a particularly preferred embodiment of the present invention, the core includes a pheromone and a natural zeolite, preferably at a quantity ratio of 0.01 to 0.1 g, more preferably 0.04 g, of pheromone per kg of zeolite. The core is preferably surrounded by An intermediate layer of starch, preferably corn starch. An active ingredient layer comprising cyclodextrin and another pheromone is disposed on this intermediate layer. The particle formed by the core, the intermediate layer, and the active ingredient layer preferably comprises a hydrophobic surface coating (preferably calcium stearate).

Another aspect of the present invention relates to a composition comprising particles according to the present invention, wherein the particles are suspended in an aqueous medium.

The particles of the present invention are suspended in an aqueous medium to apply them, for example, in a field. It is preferred that the suspension includes 0.1 to 10%, more preferred 0.5 to 5%, more preferred 0.5 to 4%, more preferred 1 to 2% of the particles according to the invention. The preferred medium is water, which ideally has a hardness of less than 25 German hardness levels (° dh) and a pH of 4 to 9, preferably 5 to 9, more preferably 6 to 8.

According to a preferred embodiment of the present invention, the aqueous medium includes at least one tenside. Tensides are added to the medium to achieve a more advantageous dispersibility of the particles according to the invention. It is preferred that the tenside used is anionic, cationic, non-ionic, or amphoteric.

The tenside is preferably selected from the group consisting of alkyl sulfonates, fatty alcohol ether sulfonates, alkylbenzene sulfonates, fatty alcohol ethoxylates, quaternary ammonium salts, fatty alcohol polyglycol ethers, alkyl glycosides, sorbitan acid esters, betaines, and combinations thereof.

The composition according to the invention includes at least one tenside, preferably at least one of the tensides mentioned above, at a concentration of 0.01 to 2%, preferably of 0.01 to 1%, more preferably of 0.01 to 0.5%.

Another aspect of the present invention relates to the use of the particles according to the invention or the composition according to the invention as a plant protection product.

Yet another aspect of the present invention relates to a method for controlling plant damaging organisms, particularly insects (see above), including bringing plants and/or the soil in which the plants grow into contact with an effective quantity of particles or a composition according to the present invention.

The particles according to the invention or the composition according to the invention can be applied using conventional methods and means.

The quantity of particles to be applied depends on the active plant protection ingredients used and on the plant damaging organisms, particularly insects, to be controlled. According to the invention, it is preferred to apply that many particles that 0.05 to 50 g active ingredient/ha, particularly preferred 0.05 to 20 g active ingredient/ha, particularly preferred 0,05 to 10 g active ingredient/ha, particularly preferred 0.05 to 5 g active ingredient/ha, particularly preferred 0.05 to 2 g active ingredient/ha, particularly preferred 0.05 to 1 g active ingredient/ha, particularly preferred 0.05 to 0.5 g active ingredient/ha, particularly preferred 0.1 to 50 g active ingredient/ha, particularly preferred 0.1 to 20 g active ingredient/ha, particularly preferred 0.1 to 10 g active ingredient/ha, particularly preferred 0.1 to 5 g active ingredient/ha, particularly preferred 0.1 to 2 g active ingredient/ha, particularly preferred 0.1 to 1 g active ingredient/ha, particularly preferred 0.1 to 0.5 g active ingredient/ha are applied, wherein the active ingredient preferably is a pheromone.

The present invention is explained with reference to the following figures and examples, however without being limited to these.

EXAMPLES

Example 1

40 kg of natural zeolite were ground using an impact mill to an average fineness of 5 μm. The temperature of up to 120° C. that developed in the process had the effect that the mineral, which was originally charged with 8.5% water, was dried to a water content of 2.9%. In this phase, a solution comprising 5.0 g pheromone 1 (capric acid methyl ester) dissolved in 2 liters of ethanol (96%) was sprayed onto the rotating zeolite, wherein the solvent evaporated immediately and an even distribution of the pheromone across the total amount of zeolite was achieved. The pheromone was immediately latently bound into the pore structure and to the surface of the zeolite.

1 liter of a hot solution (ca. 60° C.) of 50 g corn starch in water was sprayed onto this intermediate product, and an insulating intermediate layer was formed. Then 6.6 g of the aqueous solution of a second effective pheromone (8-methyl-2-decanol propanoate), complexed with cyclodextrin at a ratio of 1:1 (see Example 2), was sprayed on and dried as a second active ingredient layer. After adding a total of 100 g fine-particled calcium stearate (under 2 μm), the spray powder obtained was cooled and filled into polyethylene bags.

The fine-particled powder was easily dispersed in water. This quantity was evenly applied on 10 ha of agricultural area. After 10 weeks, the rate of unfertilized corn rootworm females was about 55-60%. A value that is comparable to the value achieved using highly toxic insecticides, which in addition are used at quantities more than 100 to 1000 times higher (kill rate of the relevant females). This shows that pheromone release and thus the disorientation effect achieved was sustained over the entire period of 10 weeks.

Example 2

The pheromone complex with cyclodextrin used in Example 1 was prepared as follows:

0.1 mol cyclodextrin 7 (CAVAMAX 7) (initial weight 114 g) were dissolved in 2500 mL water at 60° C. and 0.1 mol methyldecanol-yl-propanoate were added by dropping as pheromone (active against corn rootworm). After about one hour, the 1:1 complex that had formed was filtered off the suspension that had cooled down in the meantime, washed with water, then dried. The solid complex contained about 17% of active pheromone agent.

This complex was brought back into a soluble form by adding anionic tensides and thus prepared for spraying onto the substrate.

6.6 g of the dried (7.4 g of the wet) pheromone/cyclodextrin complex were suspended with 0.3 g sodium dodecylsulfate in 50 mL water, the filled up to 300 mL water and stirred until the complex largely transitioned into a solution or a suspension that did no longer settle was obtained. This aqueous pheromone preparation was safely sprayed onto the substrate according to Example 1 (risk of explosion).

Example 3

To study the bonding capacity of the pheromone 8-methyl-2-decanol propanoate to natural zeolite, 200 g of zeolite particles were mixed with 25 mg pheromone in 10 mL ethanol (96%) (see Example 1, paragraph 1). The zeolite particles that were treated with pheromone and dried were transferred into an Erlenmeyer flask and mixed with distilled water such that the zeolite particles were completely covered with water. The water/zeolite suspension was stirred for 60 minutes at room temperature using a magnetic stirrer. Then the water was removed and the zeolite particles were dried. After 10 weeks of storage at room temperature and 85% humidity, GC/MS (gas chromatography/mass spectrometry) was used to check if the particles still released pheromone into the environment. The volatile substances in the samples were eluted from the particles by thermal desorption before the GC/MS examination. FIG. 3 shows that the particles, after 10 weeks of storage and washing, are still capable of releasing 8-methyl-2-decanol propanoate.

Example 4

In the case of the corn rootworm (*Diabrotica virgifera virgifera*), suitable plant protection products must be applied to the growing corn seedlings by end of June/mid-July. It is particularly the flight period of the adult beetle that is of interest for the disorientation method. It starts at the end of June and ends at the beginning of October. The pheromones that cause the disorientation must therefore be available over a period of 12-14 weeks. For an optimal effect, 16 weeks (=~4 months) including about 2 weeks of application window have to be bridged. This means that the pheromones must be released for at least 16 weeks. Release tests were carried out to find out if pheromone release over this period of time is possible with the particles according to the invention. In addition, comparative tests were made with particles of a different composition.

Particles 1 and 2 correspond to the particles from Example 1 (zeolite core with intermediate layer of corn starch and a second active ingredient layer comprising cyclodextrin). Particles 3 consist of crystalline clay (sepiolite) and are produced like particle 1 (see Example 1, only sepiolite is used instead of zeolite). Like particle 3, particles 9 were prepared with talc, particles 10 with montmorillonite (phyllosilicate), particles 6 with kaolin, particles 7 with micro mica, and particles 8 with quartz. In addition, particles were prepared with a talc and montmorillonite core, which like the zeolite particles 11 and 12 do not include an intermediate layer of corn starch and no other outer layer comprising pheromone-containing cyclodextrin. The uncoated talc particles are the particles 4 and the uncoated montmorillonite particles are the particles 5.

Particles 11 and 12 correspond to particles 1 and 2, respectively, wherein these do not comprise an outer second active ingredient layer and corn starch layer. Particles 1 and 11 also had a synthetic zeolite A with a pore size of 4 Å instead of a core of natural zeolite.

To ensure comparability, all particles or minerals were ground to a fineness of 5 µm in diameter before they were charged with the same pheromone.

Particles 1 to 12 were charged with pheromones as described in Example 1 or 2, respectively, in that 5 g pheromone ¹⁄₄₀ kg were provided in the core and, where required, additional 3.3 g pheromone 2 in the coating, in total 8.3 g of active substance/40 kg, i.e. 0.2 mg/g. Particles 1 to 12 therefore just differ in that the substrate materials for the pheromone(s) are different and in that they comprise a second active ingredient layer or not (see explanations below).

To examine the release of the pheromones, a glass vessel with a volume of 950 mL (ca. 1 L) was filled over an air-permeable fritted glass filter with 5 g of the respective particles and flooded with air at a temperature of 23° C. and 85% humidity, such that a complete air exchange of the entire volume was achieved within 1 h. The pheromone quantity emitted from the particles and contained in the volume flow was measured using gas chromatography at an measuring accuracy of 0.01 µg/L, and documented. This test can be used to simulate both the uniformity and the duration of the pheromone release in nature.

The results of measuring the pheromone release (emission µg/h=µg/L air) are shown in the following table:

| | | | | | | |
|---|---|---|---|---|---|---|
| Particle 1 | 0.40 | 0.41 | 0.41 | 0.40 | 0.36 | 0.35 |
| Particle 2 | 0.30 | 0.30 | 0.28 | 0.25 | 0.28 | 0.30 |
| Particle 3 | 0.48 | 0.50 | 0.55 | 0.50 | 0.52 | 0.60 |
| Particle 4 | 0.60 | 0.72 | 0.70 | 0.74 | 0.68 | 0.70 |
| Particle 5 | 0.50 | 0.52 | 0.54 | 0.52 | 0.50 | 0.58 |
| Particle 6 | 0.52 | 0.50 | 0.53 | 0.50 | 0.48 | 0.40 |
| Particle 7 | 0.65 | 0.75 | 0.77 | 0.80 | 0.70 | 0.60 |
| Particle 8 | 0.85 | 0.90 | 0.90 | 0.88 | 0.90 | 0.92 |
| Particle 9 | 0.55 | 0.64 | 0.65 | 0.66 | 0.60 | 0.63 |
| Particle 10 | 0.52 | 0.50 | 0.48 | 0.50 | 0.50 | 0.52 |
| Particle 11 | 0.43 | 0.44 | 0.40 | 0.42 | 0.44 | 0.40 |
| Particle 12 | 0.34 | 0.33 | 0.31 | 0.30 | 0.31 | 0.30 |
| Time (total flow time) | 1 h | 5 h | 10 h | 24 h | 168 h | 700 h |
| | | | | 1 day | 1 week | 1 month |

| | | | | | |
|---|---|---|---|---|---|
| Particle 1 | 0.33 | 0.27 | 0.24 | 0.22 | 0.14 |
| Particle 2 | 0.31 | 0.28 | 0.30 | 0.32 | 0.29 |
| Particle 3 | 0.62 | 0.40 | 0.20 | 0.05 | 0.00 |
| Particle 4 | 0.65 | 0.30 | 0.03 | 0.00 | — |
| Particle 5 | 0.60 | 0.38 | 0.18 | 0.04 | 0.00 |
| Particle 6 | 0.33 | 0.28 | 0.20 | 0.00 | — |
| Particle 7 | 0.45 | 0.18 | 0.00 | — | — |
| Particle 8 | 0.43 | 0.04 | 0.00 | — | — |
| Particle 9 | 0.64 | 0.42 | 0.27 | 0.10 | 0.00 |
| Particle 10 | 0.45 | 0.37 | 0.16 | 0.10 | 0.00 |
| Particle 11 | 0.38 | 0.25 | 0.20 | 0.08 | 0.00 |
| Particle 12 | 0.35 | 0.30 | 0.28 | 0.10 | 0.00 |
| Time (total flow time) | 1000 h | 1400 h | 2100 h | 2500 h | 3000 h |
| | ~2 mo | ~3 mo | | | ~4 mo |

The particles examined and listed in the above table have the following structure and can be produced using the method according to Example 1, wherein instead of a zeolite core, another material is used for the core (see below):

Particle 1 Core of synthetic zeolite A (pore size 4 Å) with a second active ingredient layer as shown in Example 1

Particle 2 Core of natural zeolite with a second active ingredient layer as shown in Example 1

Particle 3 Core of crystalline clay (sepiolite) with a second active ingredient layer as shown in Example 1

Particle 4 Core of talc without a second active ingredient layer as shown in Example 1

Particle 5 Core of montmorillonite (phyllosilicate) without a second active ingredient layer as shown in Example 1

Particle 6 Core of kaolin with a second active ingredient layer as shown in Example 1

Particle 7 Core of micro mica with a second active ingredient layer as shown in Example 1

Particle 8 Core of quartz with a second active ingredient layer as shown in Example 1

Particle 9 Core of talc with a second active ingredient layer as shown in Example 1

Particle 10 Core of montmorillonite (phyllosilicate) with a second active ingredient layer as shown in Example 1

Particle 11 Core of synthetic zeolite A (pore size 4 Å) without a second active ingredient layer as shown in Example 1

Particle 12 Core of natural zeolite without a second active ingredient layer as shown in Example 1

Figure 1:
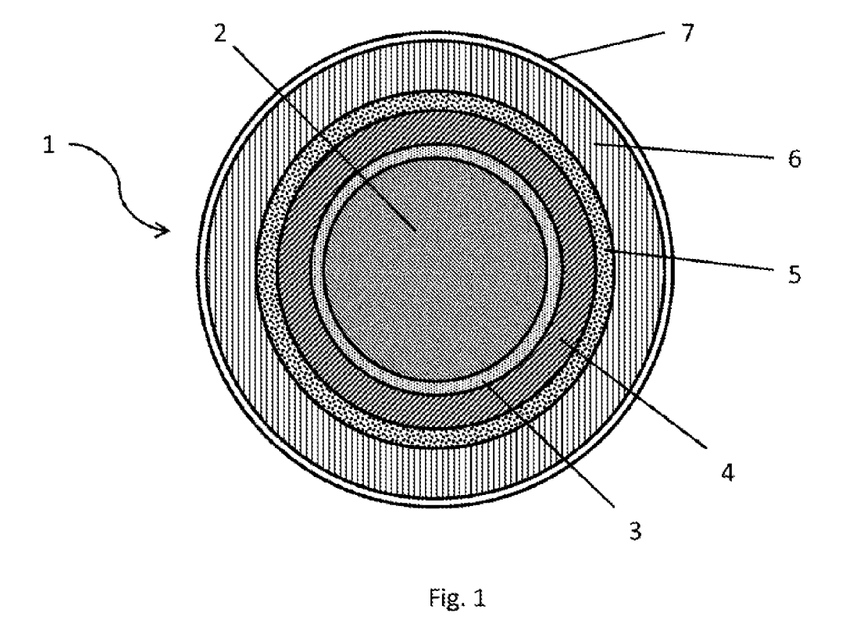
FIG. 1 shows a particle 1 according to the invention, comprising a core 2 and several layers 4 and 6 surrounding the core. The core 2 and the layers 4 and 6 include at least one active plant protection ingredient which is released over time. Intermediate layers 3 and 5 are provided between the core 2 and the layer 4 or between the layers 4 and 6, respectively, which is to prevent, inter alia, diffusion of the active plant protection ingredients, particularly pheromones, between the core 2 and the layer the layers 4 and 6 to the greatest possible extent. A surface coating 7, which is preferably hydrophobic, is provided on the outer side of the particle according to the invention.
Figure 2:
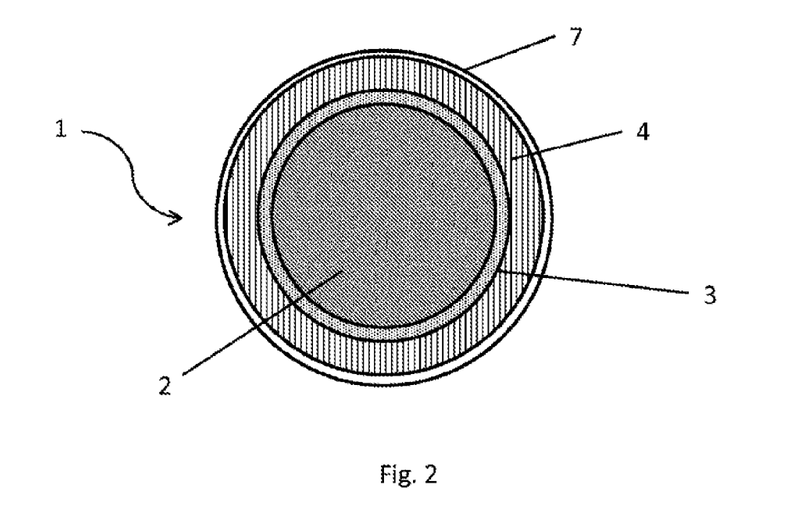
FIG. 2 shows another particle 1 according to the invention, which comprises a core 2, a layer 4 surrounding the core, an intermediate layer between the core 2 and the layer 4, and a surface coating 7. In this alternative embodiment compared to FIG. 1, the particle 1 according to the invention includes a layer 4 instead of two layers comprising active plant protection ingredients, and this layer comprises an active plant protection ingredient like the core 2.
Figure 3:
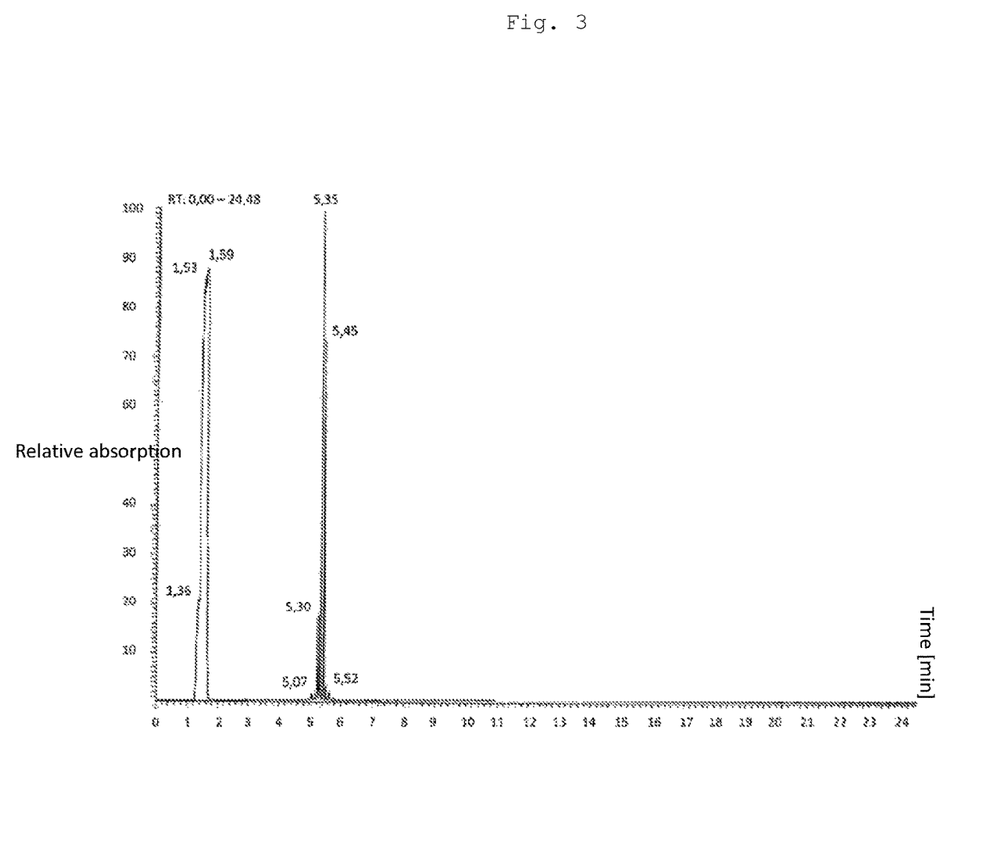
FIG. 3 shows a GC/MS measurement that revealed that the pheromone 8-methyl-2-decanol propanoate is still released even after 10 weeks of storing zeolite particle (see Example 3).
Figure 4:
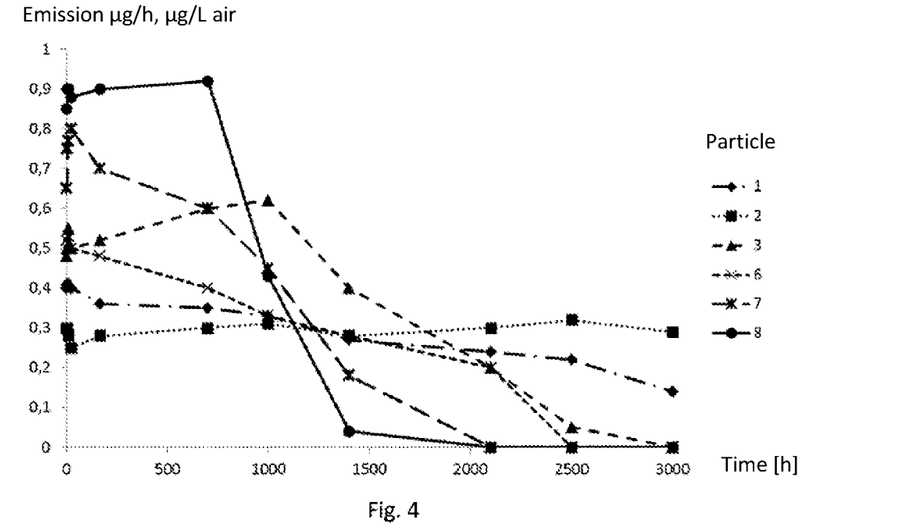
FIGS. 4 to 6 show the values listed in the table of Example 4.
Figure 5:
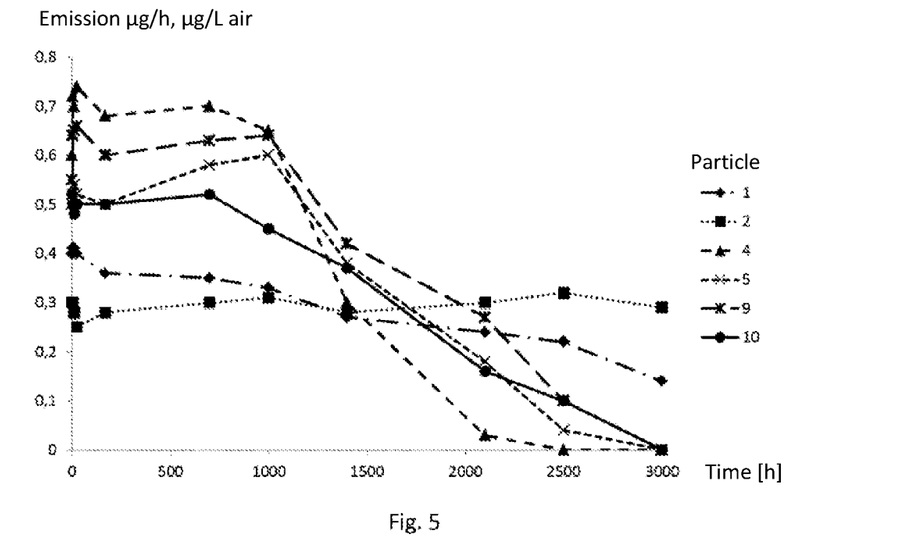
Figure 6:
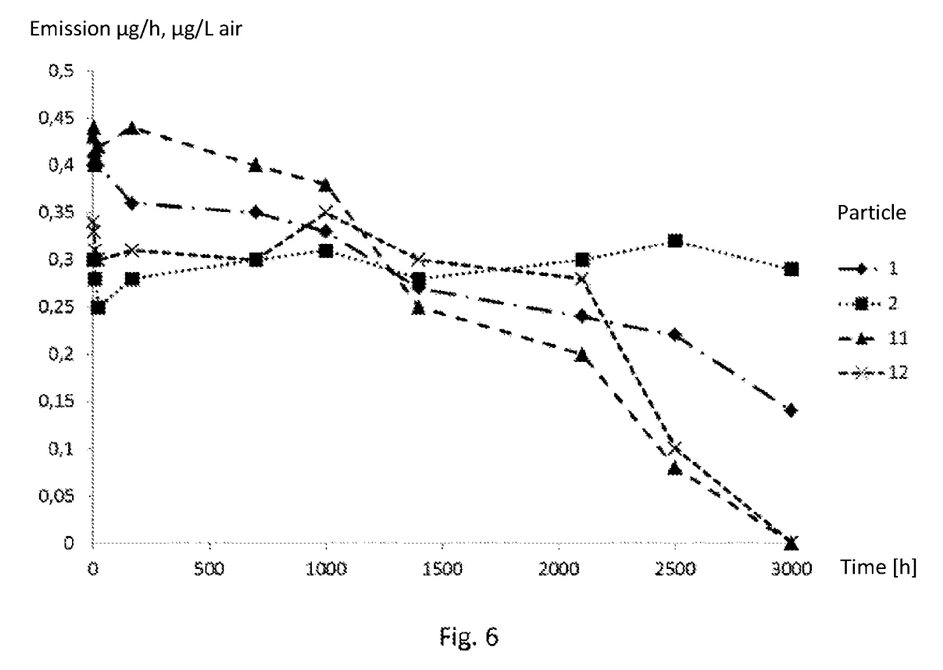

The results shown in the above table (see also FIGS. 4 to 6) show that particles comprising a zeolite core (particles 1, 2, 11, and 12) compared to particles comprising a core made of other materials (particles 3 to 10) are capable of releasing relatively constant quantities of pheromones over a relatively long period of time. The use of natural zeolites appears to be particularly advantageous, since these are even capable of constantly releasing pheromones over 4 months. In the case of synthetic zeolites, it appears to be particularly advantageous to provide a two-layer material (combination with cyclodextrin, for example; see Example 2). In such a case, pheromones can be released into the environment relatively constantly for up to 3 months.

The results for particles 3 to 10 show that these release the pheromones irregularly over the period of time observed compared to particles 1 and 2 according to the invention (a relatively large quantity at the beginning of the series of measurements, at the end a small quantity or none), or they release them over a relatively shorter period of time. Unlike particles 1 and 2, particles 11 and 12 do not have a second active ingredient layer. While particles 11 and 12 release pheromones fairly constantly over a relatively long period of time, the release period is shorter than for particles 1 and 2.

These results document impressively that particles according to the invention having a structure like particles 1 and 2 are particularly advantageous, whereas particles having the same core but no second active ingredient layer (particles 11 and 12) display a shorter period of releasing pheromones.

The invention claimed is:

1. Particles with a controllable release of at least one pheromone, wherein
   a) the particle has a core which is surrounded by one or more layers, and
   b) the core and at least one layer surrounding the core comprises at least one volatile pheromone to be released, wherein the core and/or at least one layer surrounding the core comprises a substrate for binding or for absorbing the at least one volatile pheromone to be released, wherein the substrate is capable of dispensing the absorbed volatile pheromone in a delayed manner, and the substrate comprises zeolite, wherein the volatile pheromone is a corn root worm controlling pheromone,
   wherein the particles constantly release the volatile pheromone over a time period of at least 3,000 hours, wherein the core and/or at least one layer surrounding the core includes a compound comprising a macromolecular cavity, wherein the compound is a macrocyclic compound, wherein the macrocyclic compound is an oligosaccharide or cyclic polysaccharide, wherein the volatile pheromone is capable of forming a complex with the macrocyclic compound.

2. The particles according to claim 1, characterized in that the core and the at least one layer surrounding the core comprise different pheromones.

3. The particles according to claim 1 or 2, characterized in that at least one intermediate layer is provided between the core and the at least one layer surrounding the core and including the pheromone and/or between two layers surrounding the core and including pheromone.

4. The particles according to claim 3, characterized in that the intermediate layer includes a polymer or a layered material.

5. The particles according to claim 1, characterized in that the core and/or at least one layer surrounding the core includes a porous substrate.

6. The particles according to claim 1, characterized in that the core and/or at least one layer surrounding the core includes an inorganic porous substrate selected from the group consisting of microporous minerals, phyllosilicate, and combinations thereof.

7. The particles according to claim 1, characterized in that the core includes an inorganic porous substrate and at least one layer surrounding the core includes a compound comprising a macromolecular cavity.

8. The particles according to claim 1, characterized in that the particle comprises a surface coating.

9. A composition including particles according to claim 1, wherein the particles are suspended in an aqueous medium.

10. The composition according to claim 9, characterized in that the aqueous medium includes at least one surfactant.

11. A method for controlling corn root worm, said method comprising contacting plants and/or the soil in which the plants grow with an effective quantity of particles according to any one of claims 1-6, 7, or 8.

12. The particles according to claim 4, wherein the polymer is a modified or non-modified biopolymer.

13. The particles according to claim 6, wherein the phyllosilicate is clay mineral.

14. The particles according to claim 8, wherein the surface coating is a hydrophobic surface coating.

15. The particles according to claim 1, wherein the corn root worm controlling pheromone is selected from the group consisting of 8-methyl-2-decanol propanoate, 10-methyl-2-tridecanone, 6,12-dimethyl pentadeca-2one, capric acid methyl ester, 4-methoxy cinnamic aldehyde, 2-phenyl ethanol, syn-benzaldoxime, linalool, caryophyllene, 9-dodecenyl acetate, periplanone B, and retronecine ester.

16. A method for controlling corn root worm, said method comprising contacting plants and/or the soil in which the plants grow with an effective quantity of a composition according to any one of claim 9 or 10.

* * * * *